Figure 1:
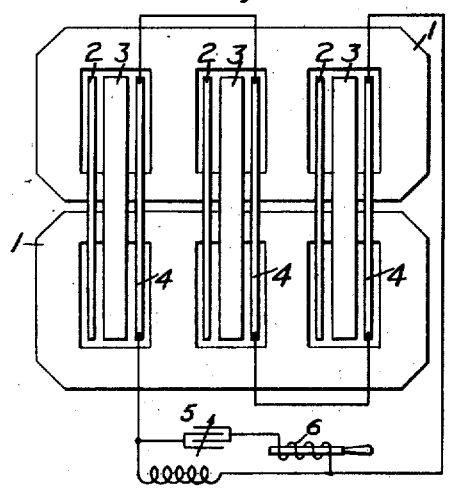

L. W. CHUBB.
TERTIARY COILS FOR TRANSFORMERS.
APPLICATION FILED JAN. 26, 1917.

1,298,665.

Patented Apr. 1, 1919.

WITNESSES:
Ed Plinke.
Geo. W. Hansen.

INVENTOR
Lewis W. Chubb.
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

TERTIARY COILS FOR TRANSFORMERS.

1,298,665.  Specification of Letters Patent.  Patented Apr. 1, 1919.

Application filed January 26, 1917. Serial No. 144,774.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Tertiary Coils for Transformers, of which the following is a specification.

My invention relates to transformers and it has special relation to transformers in which the main windings are so interconnected with one another that harmonic currents for suppressing harmonic components in the electromotive force waves impressed upon the associated distributing circuits by the main transformer windings are precluded from flowing therein. These harmonic currents are, however, permitted to flow in auxiliary circuits which are exclusive to the flow of alternating currents of selected frequencies.

An object of my invention is to provide improved means in transformers of the character indicated above which will effectively operate under all load conditions and, at the same time, be immune when the main transformer windings are subjected to short circuits and other abnormal load conditions.

In star-connected transformer windings, as well as auto-transformer windings, and particularly shell-type transformers having both their primary and secondary windings connected in star formation, harmonic currents, which insure the production of electromotive forces of sine-wave form, are precluded from flowing in the circuit unless the neutral point of said transformer windings is grounded, whereby a circuit may be established through ground for the flow of these harmonic currents.

In three-phase distributing systems employing Y-connected transformer windings having grounded neutral points, triple harmonic currents and sometimes ninth harmonic currents, as well as other currents having frequencies that are multiples of three, flow in circuits established through the neutral points and ground. These harmonic currents are necessary for insuring the production of electromotive forces of sine-wave form in the transformer phase windings, and are developed by reason of the triple and other frequency harmonics obtaining in the exciting currents employed for magnetizing the core members of the associated transformer windings.

It frequently happens, however, that it is desirable to ground the neutral points of Y-connected transformer windings. However, the flow of the harmonic currents through the ground or the voltage pulsations of the line induce disturbances in adjacent intelligence-transmission circuits, such as telephone or telegraph circuits. It is, therefore, necessary to suppress these triple-frequency disturbances and, therefore, the neutral points are insulated from ground. When both the primary and secondary transformer windings are connected in star-formation and the neutral points are insulated from ground, the voltage waves developed in the windings comprise pronounced third harmonic components which distort the voltage waves and make them depart from the desirable sine-wave forms. When transformer windings are so connected, it has been proposed to associate an auxiliary secondary winding with each pair of primary and secondary windings and to connect these auxiliary secondary windings in closed circuit and, in the case of Y-connected windings, in delta-formation, in order to permit these harmonic currents to flow in the local circuit thus produced. When permitted to flow, these harmonic currents react upon the transformer windings in such a way that electromotive force waves of sine-wave form may be developed and the neutral points of the system grounded without giving rise to inductive disturbances in adjacent circuits.

When these auxiliary delta-connected windings are employed, it has heretofore been necessary to make them of substantially large current-carrying capacity because large currents of the fundamental frequency may be induced therein when the terminal voltages become unbalanced, such for instance, as occurs when a short circuit is imposed on one of the phases of the polyphase connection. Under this condition, a high-current is usually induced in the auxiliary delta-connected winding which is liable to burn it out.

The harmonic currents flowing in the auxiliary winding are substantially constant under all load conditions since they are dependent upon the exciting currents only that are required for magnetizing the transformer core members. At the same time, these harmonic currents are of relatively low value. For these reasons, it is advantageous to make the auxiliary coil winding of relatively small current-carrying capacity, providing it can be protected against the flow of abnormally high currents of fundamental frequency.

By means of my present invention, the auxiliary secondary windings are protected against the flow of currents of high value and especially currents having the frequency of the associated fundamental electromotive force waves. At the same time the harmonic currents are permitted to flow in the auxiliary windings without being offered any substantial impedance. In consequence thereof, the auxiliary secondary windings remain intact when abnormal unbalancing conditions obtain in the associated distributing system, such as are occasioned when short circuits are imposed upon or one more of the several phases.

Figure 2:
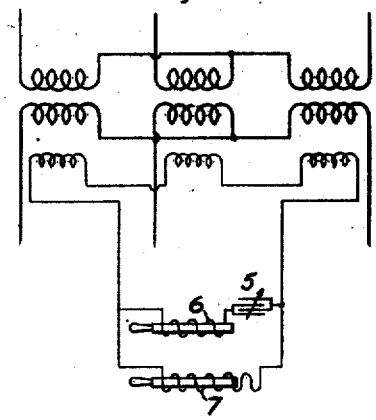
Figure 3:
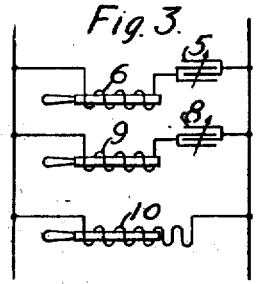
Figure 4:
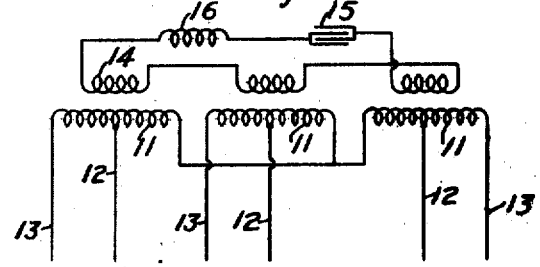
Figure 5:
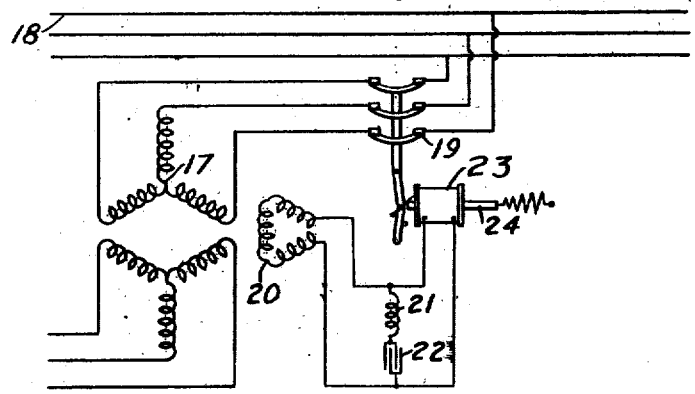

For a better understanding of the nature and scope of my invention, reference may be had to the following description and the accompanying drawing in which Figure 1 is a diagrammatic representation of a three-phase shell-type transformer having an auxiliary secondary winding which is protected in accordance with my invention; Fig. 2 illustrates diagrammatically the manner of making connections for the windings of a transformer embodying my invention; Fig. 3 is a modified form of a portion of the diagram of Fig. 2; Fig. 4 is a diagram showing my invention applied to a star-connected auto transformer winding, and Fig. 5 shows my invention employed in connection with a circuit interrupter which serves to afford protection to the associated transformer windings.

In Fig. 1, a three-phase transformer, comprising core members 1, primary coils 2 and secondary coils 3, is provided with a group of auxiliary secondary coils 4. Each group of primary and secondary windings 2 and 3 is severally associated with one of the coils 4. The coils 4 are connected in delta-formation or closed circuit with one another through an adjustable condensive reactance element 5 and an adjustable inductive reactance element 6. The elements 5 and 6 are connected in series relationship and their electrical constants are, in this instance, so adjusted as to form a series resonant circuit for alternating currents of triple harmonic frequency. As mentioned above, triple-frequency harmonic currents are desirable for insuring the production of electromotive forces of sine-wave form in the transformer windings, as well as to preclude the flow of currents in the associated exterior distributing circuit and ground which may unfavorably react upon adjacent intelligence-transmission circuits.

Although triple-frequency currents are permitted to flow non-reactively through the delta-connected auxiliary coils 4, currents of other frequency are offered a substantially high impedance because of the reactance offered by the elements 5 and 6. When the voltages across the main transformer windings become unbalanced, there is a tendency for an alternating current of fundamental frequency to flow in the tertiary coils 4 in order to reëstablish or maintain balanced-voltage conditions. If these currents, thus tending to restore balanced conditions, are sufficiently high they will burn out the coils 4 unless provision is made for limiting them to a safe value. In this particular instance, the elements 5 and 6 offer sufficient reactance to impede the flow of these balancing currents in the secondary coils 4.

In Fig. 2, the condensive and inductive elements 5 and 6 of Fig. 1 are shunted by a second inductive element 7 the electrical constants of which are so adjusted that an anti-resonant path is established for alternating currents of fundamental or normal distributing frequency. In other words, a circuit comprising a path in which parallel resonance to the fundamental frequency obtains is established through the auxiliary coils 4. As a result, alternating currents of fundamental frequency are precluded from flowing in the closed circuit comprising the coils 4. At the same time, triple-frequency harmonic currents are permitted to flow non-reactively through these coils by reason of the series resonant circuit established through the elements 5 and 6.

The inductive element 7 is supplied to preclude the flow of alternating currents of fundamental frequency because the elements 5 and 6, in combination, develop a condensive-reactance characteristic when impressed with alternating currents of a lower frequency than triple harmonic frequency. Therefore, to make an anti-resonant path for alternating currents of normal distributing frequency, the element 7 is connected in shunt to the elements 5 and 6. In this manner, a parallel resonant circuit is formed which precludes the flow through the coils 4 of currents of fundamental frequency.

Since the auxiliary delta-connected windings 4 are usually inaccessible in power transformers, and it is difficult, when designing transformers, to anticipate the values of the currents that may develop when short circuits are imposed upon the associated distributing system, the auxiliary windings 4 are, in this manner, insured against overloads which may cause burn-outs and render the transformer unserviceable until the proper repairs are made.

In Fig. 3, the elements 5 and 6 provide a series resonant path for the non-reactive flow of triple-frequency currents. A second series resonant circuit, comprising elements 8 and 9, furnishes a non-reactive path for alternating currents of another frequency, which in Y-connected three-phase transformer windings will usually correspond to the frequency of the ninth-harmonic component current. It is well known that, in addition to triple-efficiency currents, ninth-harmonic currents, under certain conditions, are also desirable for preventing voltage-wave-shape distortions. It is, therefore, desirable to provide a non-reactive path for the flow of ninth harmonic currents through the coils 4, as well as triple harmonic currents.

The two series resonant circuits comprising the elements 5 and 6 and the elements 8 and 9, in combination, will develop a condensive reactance characteristic when impressed with alternating currents of fundamental frequency. Since it is desired to limit the flow of alternating currents having fundamental frequency in the auxiliary secondary coil windings, an adjustable inductive-reactance element 10 is connected in shunt to the aforementioned series resonant circuits. The electrical constants of the inductive element 10 are so adjusted that it, in combination with the two series resonant circuits, furnishes an anti-resonant path for alternating currents of fundamental frequency. Therefore, the coils 4 are protected against the flow of fundamental-frequency currents and, at the same time, provide anti-resonant paths for triple-harmonic as well as ninth-harmonic currents.

In Fig. 4, transformer windings 11 are connected in star-formation and provided with taps 12 for furnishing currents to a low-voltage circuit. High-tension leads 13 are connected to the high-voltage circuit, and the windings 11 may, therefore, be considered as forming a Y-connected autotransformer. An auxiliary coil 14 is associated with each winding 11 and the three coils 14 serve in the same manner as the auxiliary coils 4 of Figs. 1 and 2.

A condensive-reactance element 15 and an inductive-reactance element 16 are connected in series circuit in the delta formation comprising the windings 14 in order to provide a series resonant path for triple-frequency currents.

In Fig. 5, Y-connected transformer windings 17 are connected to distributing mains 18 through a circuit interrupter 19. A group of auxiliary delta-connected coils 20 which, as mentioned above, are severally inductively related to the windings 17 for permitting the non-reactive flow of triple-frequency harmonic currents, is connected in circuit with a series resonant circuit comprising an inductive element 21 and a condensive element 22. The elements 21 and 22, in combination, render the coils 20 non-reactive to the flow of triple-frequency currents.

The circuit interrupter 19 is provided with an actuating coil 23 which influences a plunger 24. The coil 23 is connected in shunt to the series resonant circuit comprising the elements 21 and 22.

If a short circuit or any severe unbalanced condition occurs upon one phase of the distributing circuit comprising the mains 18, it is desirable to disconnect the transformer windings 17 from circuit. When such an unbalanced condition obtains, a fundamental-frequency current will tend to flow in the circuit comprising the auxiliary coils 20. By reason of the impedance offered to the flow of this fundamental-frequency current by the elements 21 and 22, a substantial voltage will be impressed upon the coil winding 23 which will cause it to actuate the plunger 24 and, in turn, actuate the circuit interrupter 19. The auxiliary coils 20, in this instance, permit triple-frequency currents to flow therethrough without impressing any voltage upon the coil 23 of the circuit interrupter, since the voltage obtaining across the elements 21 and 22 will be negligible. When currents of fundamental frequency flow in the auxiliary circuit, however, which are occasioned when unbalanced conditions obtain in the distributing circuit, the voltage developed across the elements 21 and 22 will be sufficient to energize the coil 23 and, in turn, actuate the circuit interrupter 19.

In certain instances, it may be unnecessary to employ the series resonant circuit comprising the elements 21 and 22. In case this resonant circuit is eliminated, triple-frequency currents will ordinarily flow in the delta-connected windings 20 and the actuating coil 23 of the circuit interrupter. The circuit interrupter may be so adjusted that it will not be actuated by any triple-frequency current that traverses the circuit comprising the coil winding 23. Since the value of the triple-frequency current is substantially constant under all load conditions, this adjustment may be easily effected. When severe unbalancing occurs in the distributing system, currents of fundamental frequency will flow in the local circuit comprising the actuating coil 23. If this current is of a sufficiently high value, the coil 23 will actuate the circuit breaker 19 to disconnect the windings 17 from circuit.

While I have described, in detail, my invention as applied to three-phase Y-connected transformer windings, it will be apparent to those skilled in the art that the same method may be employed for protecting auxiliary secondary coils on transformer windings that are connected in other polyphase formations. Under these circumstances, however, the resonant path must be properly tuned to the frequency of those harmonic currents which shall preclude the distortion of the resulting voltage waveforms. For instance, in a star connection comprising $n$ windings, the currents desired in the closed circuit comprising the $n$ auxiliary secondary windings will be of the $n$th frequency and odd multiples thereof. It is desirable, therefore, to limit the flow in the auxiliary secondary coils of alternating currents of fundamental frequency and, to this end, the resonating elements may be combined with other elements having the proper characteristics for establishing anti-resonant circuits, as mentioned above. It is also apparent that my invention may be employed when a plurality of single-phase transformers are employed in star-connected formations for developing polyphase alternating currents for distributing purposes.

It, therefore, follows that, while I have shown and described one embodiment only of my invention, other modifications may be made which do not depart from the scope of the appended claims.

I claim as my invention:

1. In a transformer, the combination with three groups of three-phase coils two of which are star-connected and the other of which is delta-connected, of means for permitting alternating currents of a selected frequency only to flow non-reactively through said delta-connected winding while the flow therethrough of alternating currents of other frequencies is offered high impedance.

2. In a transformer, the combination with a plurality of groups of polyphase coils two of which are star-connected and the other of which is connected in a closed circuit, of means for permitting alternating currents of a selected frequency only to flow non-reactively through said closed-circuit group while the flow therethrough of alternating currents of other frequencies is substantially impeded.

3. A transformer having star-connected primary coils, star-connected secondary coils, a group of delta-connected auxiliary secondary coils, and means for permitting alternating currents of a selected frequency only to flow non-reactively through said delta-connected coils while the flow therethrough of alternating currents of other frequencies is substantially impeded.

4. A transformer having star-connected primary coils, star-connected secondary coils, a group of auxiliary secondary coils that are adapted for connection in a closed circuit, and means inserted in said closed circuit for permitting alternating currents of a selected frequency only to flow non-reactively therethrough.

5. A transformer having star-connected primary coils, star-connected secondary coils, a group of auxiliary secondary coils that are adapted for connection in a closed circuit, and condensive and inductive reactive elements connected in said closed circuit, the electrical constants of said elements being so adjusted as to establish series resonance in said closed circuit for the non-reactive flow therethrough of an alternating current of a selected frequency only.

6. A transformer having Y-connected primary coils, Y-connected secondary coils, a group of delta-connected auxiliary secondary coils, and condensive and inductive reactive elements connected in circuit with said delta-connected coils, the electrical constants of said elements being so adjusted as to establish a series resonant path therethrough for alternating currents of a selected frequency only and an anti-resonant path for alternating currents of another selected frequency.

7. In a system of distribution, the combination with star-connected primary transformer coils and star-connected secondary coils, of auxiliary secondary coils adapted for connection in a closed circuit, and means connected in series with said auxiliary secondary coils for establishing therethrough a resonant circuit for the non-reactive flow of alternating currents of one selected frequency and an anti-resonant circuit for the flow of alternating currents of the normal distributing frequency.

8. In a system of distribution, the combination with Y-connected primary transformer coils and Y-connected secondary coils, of auxiliary secondary coils adapted for connection in delta-formation, and means connected in series with said delta-connected coils for establishing therethrough a resonant circuit for the non-reactive flow of alternating currents having triple normal distributing frequency, and an anti-resonant circuit for the flow of alternating currents of normal distributing frequency.

9. In a system of distribution, the combination with Y-connected primary transformer coils and Y-connected secondary coils, of auxiliary secondary coils adapted for connection in delta-formation, and means connected in series with said auxiliary secondary coils for establishing therethrough resonant circuits for the non-reactive flow of alternating currents having frequencies which are multiples of three of the normal distributing frequency and an anti-resonant circuit for the flow of alternating currents of the normal distributing frequency.

10. In a system of distribution, the combination with n-connected windings that are connected to a common point, of n-auxiliary windings severally associated with said first windings, the n-auxiliary windings being connected in a closed circuit, and means for establishing therethrough a resonant circuit for the non-reactive flow of alternating currents of n-frequency.

11. In a system of distribution, the combination with n-connected windings that are connected to a common point, of n-auxiliary windings severally associated with said first windings, the n-auxiliary windings being connected in a closed circuit, means for establishing therethrough a resonant circuit for the non-reactive flow of alternating currents having frequencies that are multiples of n and an anti-resonant circuit for the flow of alternating currents of fundamental frequency.

12. The combination with distributing mains for polyphase power currents, star-connected windings, and a circuit interrupter for connecting said windings to said mains, of auxiliary coils that are inductively related to said star-connected windings and adapted for connection in a closed circuit, means connected in series with said auxiliary coils for establishing therethrough a resonant circuit for the non-reactive flow of alternating currents of a selected frequency, and means for actuating said circuit interrupter when alternating currents of other frequencies tend to flow through said auxiliary coils.

13. The combination with distributing mains for three-phase currents, Y-connected windings, and a circuit interrupter for connecting said windings to said mains, of auxiliary coils severally inductively related to said Y-connected windings and adapted for connection in delta-formation, means connected in series with said auxiliary coils for establishing therethrough a resonant circuit for the non-reactive flow of alternating currents having triple normal distributing frequency, and means for actuating said circuit interrupter when alternating currents of normal distributing frequency tend to flow through said auxiliary coils.

In testimony whereof, I have hereunto subscribed my name this 19th day of January, 1917.

LEWIS W. CHUBB.